United States Patent
Chadha et al.

(10) Patent No.: US 8,745,307 B2
(45) Date of Patent: Jun. 3, 2014

(54) MULTIPLE PAGE SIZE SEGMENT ENCODING

(75) Inventors: Sundeep Chadha, Austin, TX (US);
Cathy May, Yorktown, NY (US);
Naresh Nayar, Rochester, MN (US);
Randal Craig Swanberg, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 745 days.

(21) Appl. No.: 12/779,563

(22) Filed: May 13, 2010

(65) Prior Publication Data

US 2011/0283040 A1    Nov. 17, 2011

(51) Int. Cl.
*G06F 12/00* (2006.01)
*G06F 12/10* (2006.01)

(52) U.S. Cl.
CPC ........ *G06F 12/1018* (2013.01); *G06F 12/1036* (2013.01)
USPC ........ 711/3; 711/206; 711/216; 711/E12.056; 711/E12.059

(58) Field of Classification Search
CPC ............ G06F 12/1018; G06F 12/1009; G06F 12/1036
USPC ...................... 711/212, 206, 216, 3, E12.056, 711/E12.059, E12.001
See application file for complete search history.

(56) References Cited

U.S. PATENT DOCUMENTS

| | | | |
|---|---|---|---|
| 5,058,003 A | 10/1991 | White | 711/209 |
| 5,375,214 A | 12/1994 | Mirza et al. | 711/207 |
| 5,446,854 A | 8/1995 | Khalidi et al. | 711/1 |
| 5,465,337 A * | 11/1995 | Kong | 711/207 |
| 5,895,501 A | 4/1999 | Smith | |
| 6,182,089 B1 | 1/2001 | Ganapathy et al. | |
| 6,216,214 B1 | 4/2001 | Bryg et al. | 711/207 |
| 6,393,544 B1 | 5/2002 | Bryg et al. | 711/220 |
| 6,549,997 B2 | 4/2003 | Kalyanasundharam | 711/207 |
| 6,625,715 B1 | 9/2003 | Mathews | 711/207 |
| 7,089,398 B2 | 8/2006 | Zhang | 711/207 |
| 7,100,018 B2 | 8/2006 | Zhang et al. | |
| 7,117,339 B2 | 10/2006 | Gurumoorthy et al. | 711/209 |
| 7,159,095 B2 | 1/2007 | Dale et al. | 711/206 |
| 7,284,112 B2 | 10/2007 | Bradford et al. | 711/206 |
| 7,370,174 B2 | 5/2008 | Arizpe et al. | 711/206 |
| 7,487,329 B2 | 2/2009 | Hepkin et al. | |

(Continued)

OTHER PUBLICATIONS

Power ISA Version 2.06, Softcopy distribution, http://www.power.org/resources/reading/, Jan. 30, 2009, pp. 770-790.

(Continued)

*Primary Examiner* — Pierre-Michel Bataille
(74) *Attorney, Agent, or Firm* — VanLeeuwen & VanLeeuwen; Diana R. Gerhardt (57) ABSTRACT

An approach identifies an amount of high order bits used to store a memory address in a memory address field that is included in a memory. This approach calculates at least one minimum number of low order bits not used to store the address with the calculation being based on the identified amount of high order bits. The approach retrieves a data element from one of the identified minimum number of low order bits of the address field and also retrieves a second data element from one of the one of the identified minimum number of low order bits of the address field.

25 Claims, 9 Drawing Sheets

(56) References Cited

U.S. PATENT DOCUMENTS

| | | | |
|---|---|---|---|
| 7,590,820 B2 | 9/2009 | Dong et al. | 711/209 |
| 7,607,048 B2 | 10/2009 | Echeruo et al. | |
| 7,917,725 B2 * | 3/2011 | Stecher | 711/207 |
| 7,940,277 B2 * | 5/2011 | Hansen et al. | 345/522 |
| 2002/0133685 A1 | 9/2002 | Kalyanasundharam | 711/207 |
| 2004/0221128 A1 | 11/2004 | Beecroft et al. | 711/203 |
| 2006/0004795 A1 | 1/2006 | Shah et al. | 711/203 |
| 2006/0161758 A1 | 7/2006 | Bradford et al. | 711/202 |
| 2011/0276778 A1 | 11/2011 | Dooley et al. | 711/207 |

OTHER PUBLICATIONS

Office Action for U.S. Appl. No. 12/775,652 (Dooley et al., "Efficient Support of Multiple Page Size Segments," filed May 7, 2010), U.S. Patent and Trademark Office, mailed Dec. 17, 2012, 16 pages.

Good-et al.; "Segment Spage Support"; ip.com/ibm TDB; Mar. 1, 1990.

Schneider-et al.; "Scalable Locality-Conscious Multithreaded Memory Allocation"; ACM Digital Library; pp. 84-95; Jun. 2006.

Panda-et al.; "Data and Memory Optimization Techniques for Embedded Systems"; ACM Digital Library; pp. 149-206; vol. 6, No. 2; Apr. 2001.

Middha-et al.; "MTSS: Multitask Stack Sharing for Embedded Systems"; ACM Digital Library; vol. 7, No. 4, Article 46, Jul. 2008.

Cekleov et al., "Virtual-Address Caches, Part 1: Problems and Solutions in Uniprocessors," IEEE Micro 17, Sep. 5, 1997, pp. 64-71.

Final Office Action for U.S. Appl. No. 12/775,652 (Dooley et al., "Efficient Support of Multiple Page Size Segments," filed May 7, 2010), U.S. Patent and Trademark Office, mailed Jul. 8, 2013, 26 pages.

\* cited by examiner

MULTIPLE PAGE SIZE SEGMENT ENCODING

BACKGROUND

Developers of modern operating systems increasingly desire support of multiple page segment sizes simultaneously. Using larger virtual memory page sizes for an application's memory can improve an application's performance and throughput due to hardware efficiencies associated with larger page sizes. Using a larger page size can decrease the hardware latency of translating a virtual page address to a physical page address.

SUMMARY

An approach identifies an amount of high order bits used to store a memory address in a memory address field that is included in a memory. This approach calculates at least one minimum number of low order bits not used to store the address with the calculation being based on the identified amount of high order bits. The approach retrieves a data element from one of the identified minimum number of low order bits of the address field and also retrieves a second data element from one of the identified minimum number of low order bits of the address field.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention.

Figure 1:
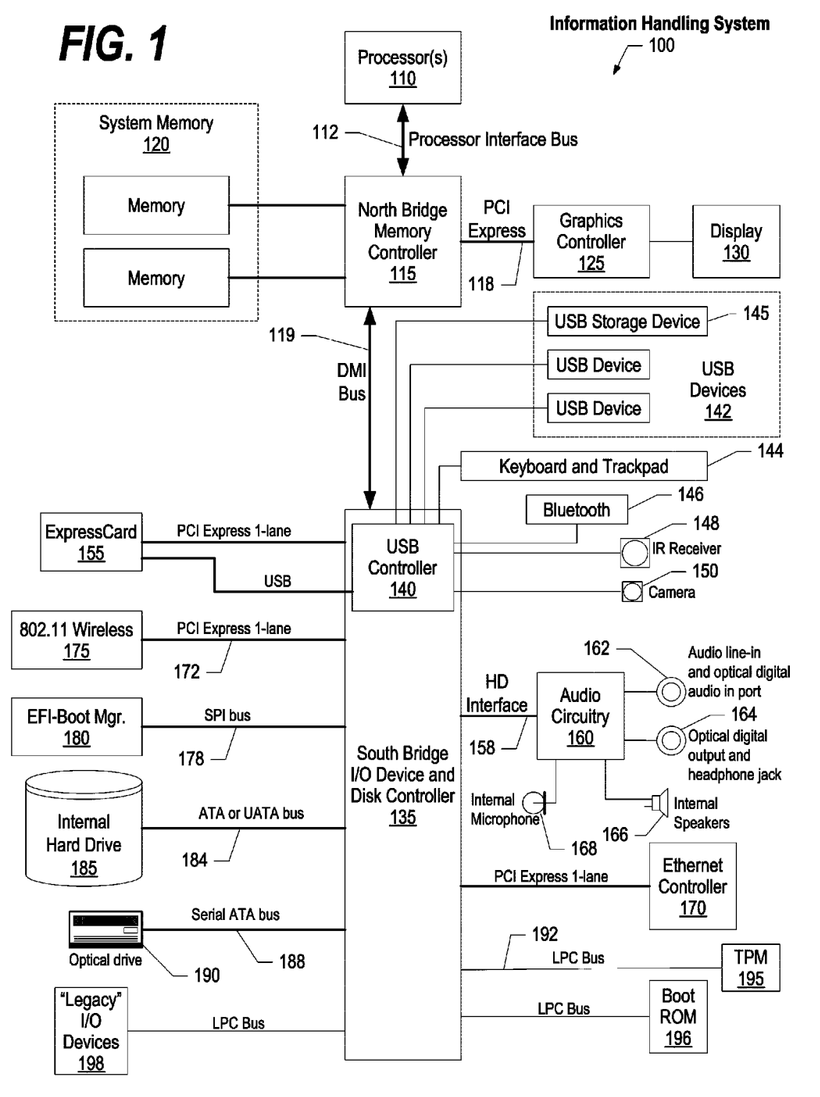
FIG. 1 is a block diagram of a data processing system in which the methods described herein can be implemented.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 2:
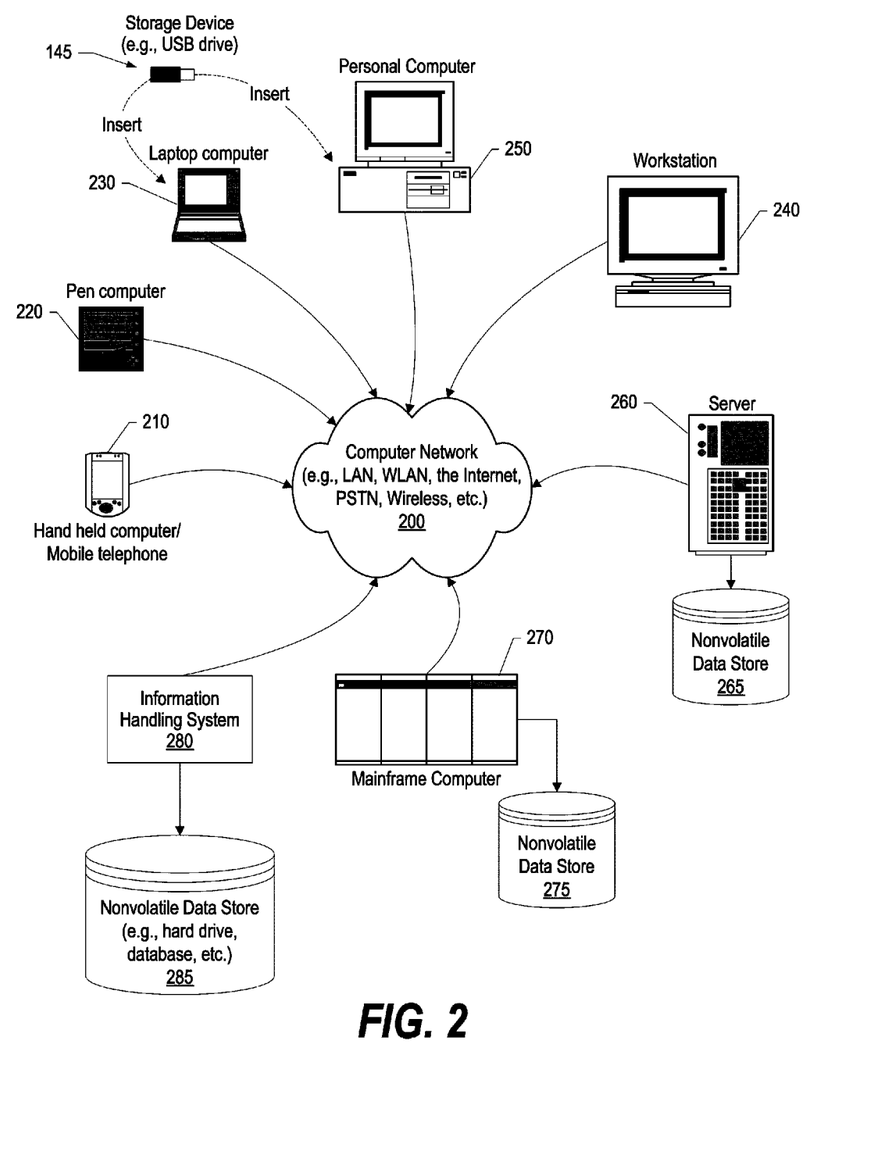
FIG. 2 is a network diagram of various types of data processing systems connected via a computer network.

FIG. 2 is a network diagram of various types of data processing systems connected via a computer network. FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
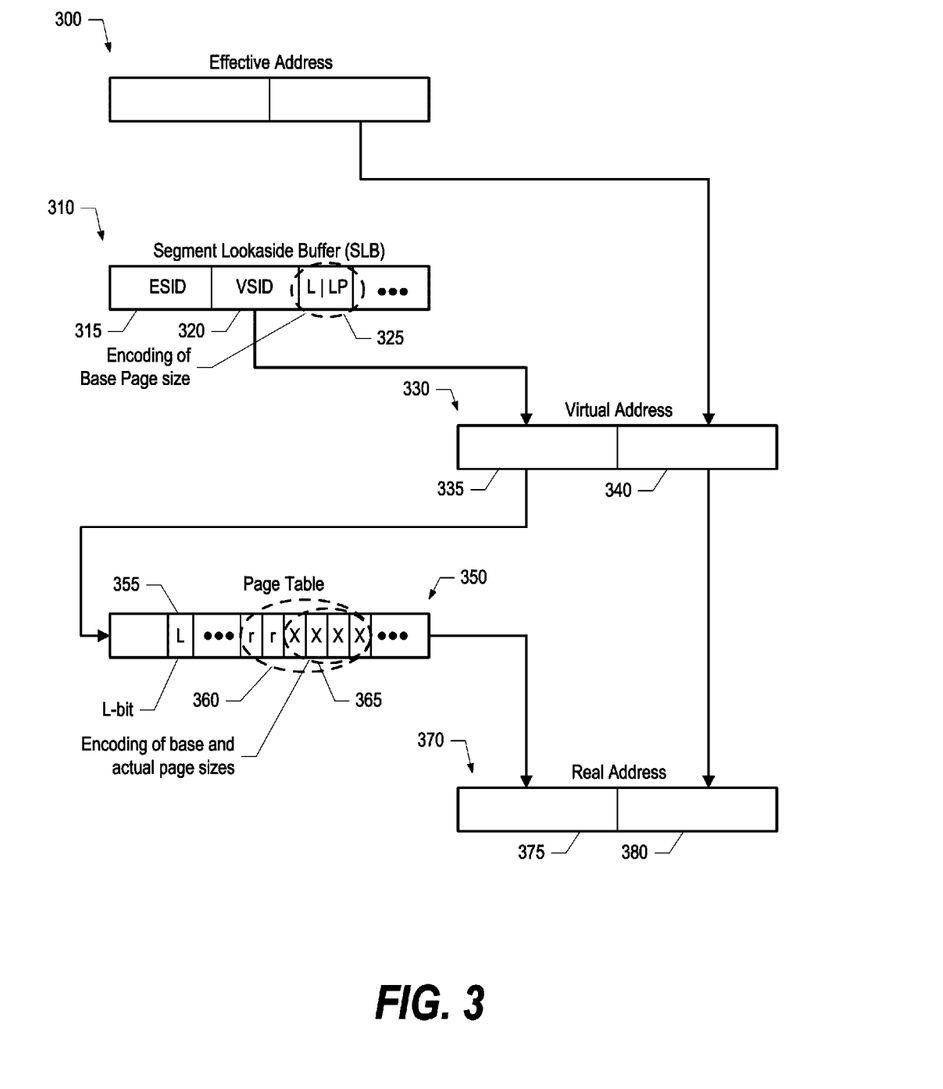
FIG. 3 is an exemplary block diagram of an address translation system.

FIG. 3 is an exemplary block diagram of an address translation system. An address translation mechanism translates effective address 300 to virtual address 330 using segment lookaside buffer (SLB) 310. Each entry in the SLB typically includes an Effective Segment ID (ESID) 315 and a corresponding Virtual Segment ID (VSID) 320. The high order bits of the effective address 300 are compared to the ESIDs in SLB 310, and when a match is found, the corresponding VSID is output by the SLB as the high order bits of the virtual address 330. The high order bits of the virtual address 330 constitute a virtual page number (VPN), which is compared to the VPNs in the page table 350, and when a match is found, the corresponding real page frame number is then output by the page table 350 as the high order bits 375 of the real address 370. Note that the address translation system passes the low order bits of the effective address 300 directly to low order bits 380 of the virtual address 330, and are passed on to the low order bits 380 of real address 370. The address translation mechanism further translates virtual address 330 to real address 370 using an entry from page table 350.

Returning to SLB 310, each SLB entry also includes encoding bits 325 (LLP) bits that identify the base page size. This base page size determines the hashing algorithm that is used to hash page table 350. In one embodiment, one of the bits in encoding bits 325 is used to identify whether any page size encoding is recorded in the corresponding page table entry 350. For example, in one implementation, a 4 KB base page size is the smallest page size and, if a 4 KB base page size is being used, then all address bits 360 included in the corresponding page table entry 350 are used to store the address and there are no bits leftover to use for encoding page sizes. So, in this implementation, when a 4 KB base page size is encountered (e.g., L bit from SLB 310 is '0') then both the base and actual page sizes is 4 KB. However, if the base page size is larger than 4 KB, then there will be one or more low order bits in memory address field 360 that can be used to encode one or more data elements (page table encoding bits 365). In FIG. 3, the low order bits of the address fields in the page table memory structure are denoted as "X". The larger the base page size, the more low order bits will not be needed to store the address and, consequently, the more low order bits that are available to encode one or more data elements. In one embodiment, two data elements are encoded in page table encoding bits 365—the base page size and the actual page size.

Figure 5:
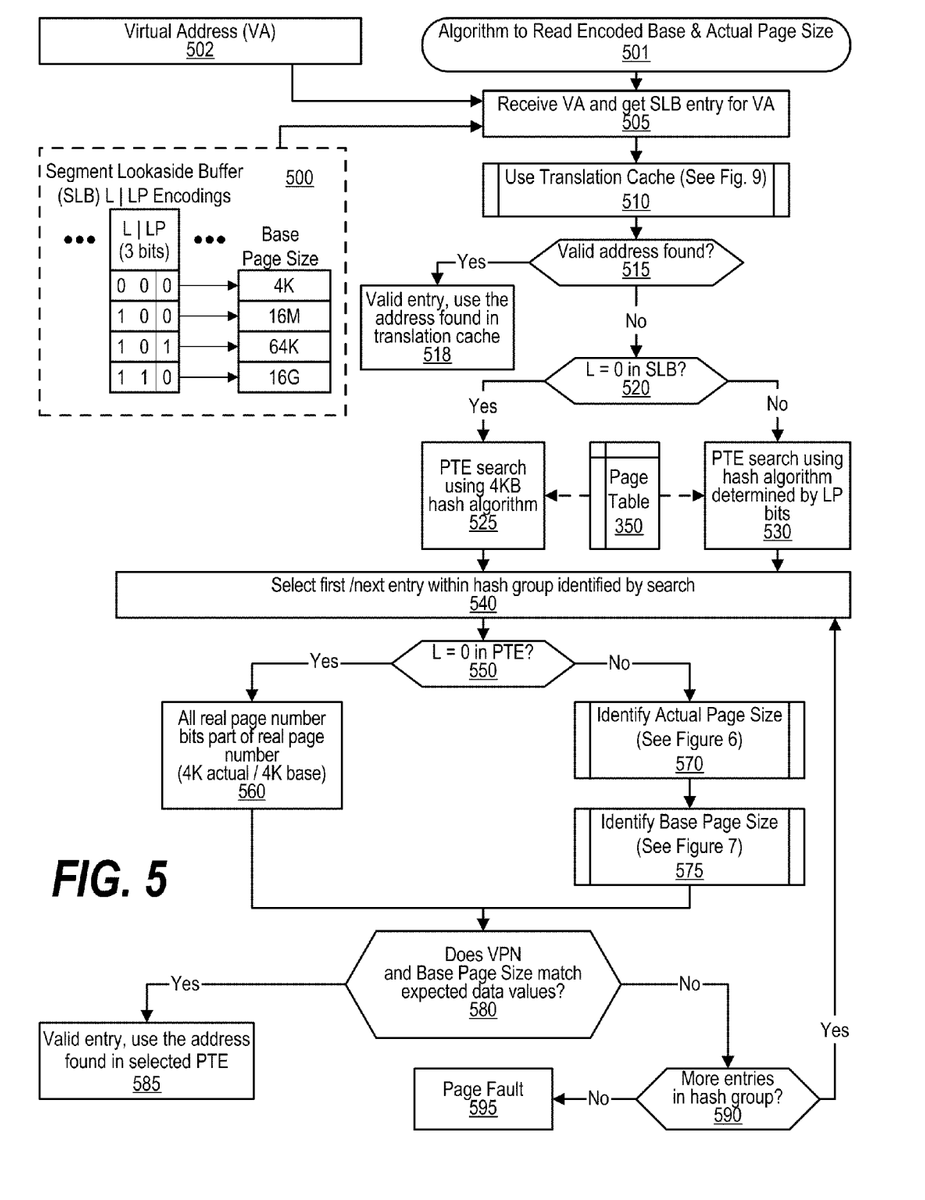
FIG. 5 is an exemplary flowchart diagram of a process that reads the PTE encoding scheme.

Returning again to SLB 310, when the base page size is not the smallest supported size (e.g., 4 KB, etc.), then SLB encoding bits 325 are used to encode the base page size. In one embodiment, SLB encoding bits include three bits. One of the bits (e.g., the 'L' bit) identifies whether the base page size is the smallest page size. In this embodiment, the other bits encode the base page size when it is larger than the smallest supported size. For example, SLB encodings 500 shown in FIG. 5, provide support for three larger base page sizes—64 KB, 16 MB, and 16 GB. A total of eight different base page sizes can be supported with three SLB encoding bits with example encodings 500 using half of this amount to encode base page sizes.

Turning back to page table 350, each entry also includes a bit (L-bit 355) that identifies whether the smallest base page size is being used. In this manner, within each page table entry, the L-bit identifies whether any data elements are encoded in page table encodings 365. Processing performs algorithms shown in FIGS. 6 and 7 to identify two distinct data elements encoded in page table encodings 365. In the example shown in FIGS. 6 and 7, actual and base page table sizes are encoded in page table encodings 365.

Figure 4:
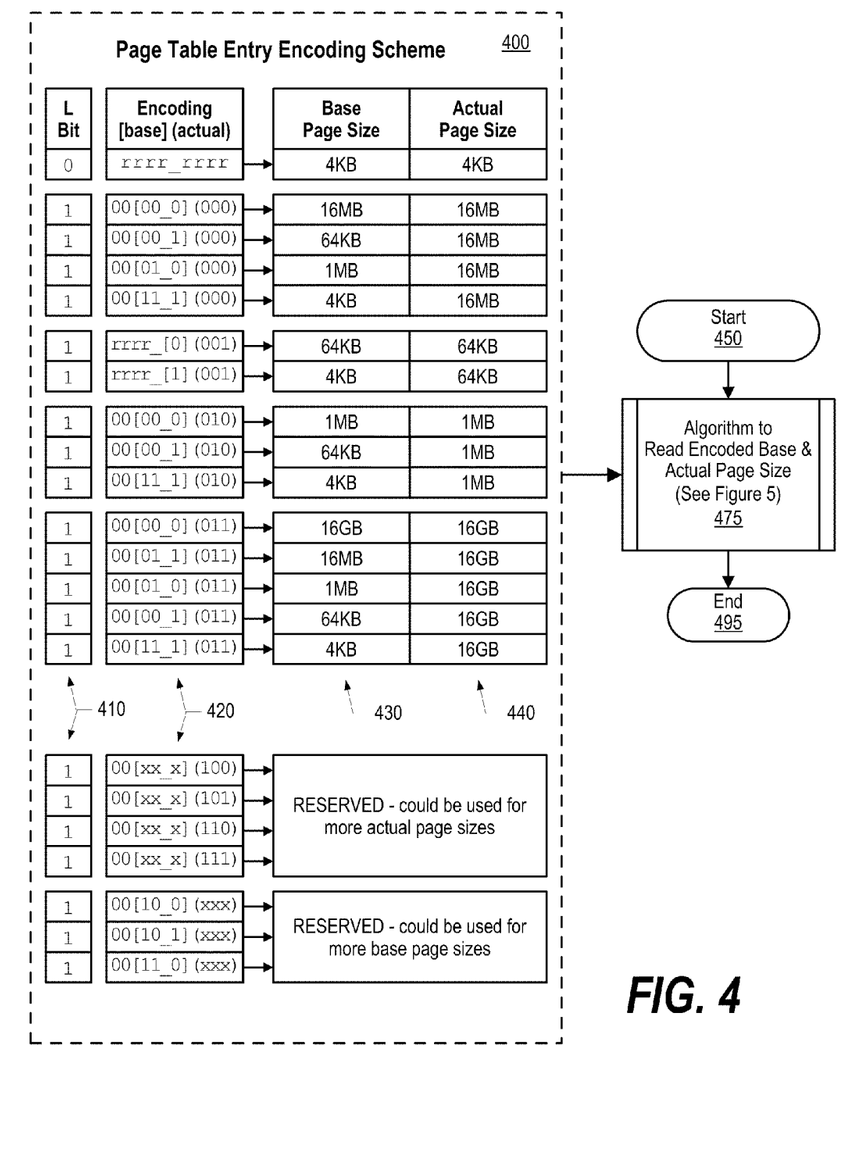
FIG. 4 is an exemplary diagram of a page table entry (PTE) encoding scheme.

FIG. 4 is an exemplary diagram of a page table entry (PTE) encoding scheme. In the example introduced in FIG. 3, two distinct data elements are encoded in the low order bits of the memory address field included in the page table memory structure. These two distinct data elements are the actual page size and the base page size. In addition, and as discussed with reference to FIG. 3, each page table entry includes an "L" bit that identifies those entries that have the smallest page size (in which case, the memory address field is not used to encode any data elements). Returning to FIG. 4, an example of page table entry encoding scheme 400 is shown. The left-most column (column 410) is the "L" bit. Encoding column 420 depicts encodings used for various base and actual page sizes. The letter 'r' in encoding column 420 represents a real page number (not used for encoding of data elements). The bit values enclosed in parentheses (e.g., "(000)", etc.) represent encodings for a first data element (e.g., an actual page size, etc.), while the bit values enclosed in square brackets (e.g., "00_0", etc.) represent encodings for a second data element (e.g., a base page size) Note that the underscores ("_") are not part of the encodings and are simply included to visually separate the first four bits of encoding from the last four bits. Finally, the bottom of encoding scheme 400 includes additional encodings that could be used for additional first and second data element values (e.g., additional actual page sizes and additional base page sizes). In this section, bit values of 'X' note as yet undetermined values that could be assigned to encode additional data element values.

The first row of encoding scheme 400 shows an entry for the smallest supported page size (e.g., 4 KB, etc.). Note that, as previously discussed, all of the encoding bits 420 for this column are used to store the real address value. Also, as discussed above, this entry is identified as a smallest supported page size due to the "L" bit (410) of this entry being '0'. Each of the other entries shown has an "L" bit value of '1' noting that the base page size of each of these entries is larger than the smallest supported page size (e.g., larger than 4 KB, etc.).

In one embodiment, an encoding algorithm reads encoding bits from right to left. In the embodiment shown, the three right-most (lower order) bits are used to encode the first data element (e.g., the actual page size, etc.). In the example shown, an encoding of '000' identifies the actual page size as being 16 MB, an encoding of '001' identifies the actual page size as being 64 KB, an encoding of '010' identifies the actual page size as being 1 MB, and an encoding of '011' identifies the actual page size as being 16 GB. Note that in the example provided, encodings of '100', '101', '110', and '111' are not used and can therefore be used to encode additional actual page sizes if desired.

In one embodiment, the second data element (e.g., the base page size, etc.) is identified based on the identified first data element (e.g., the actual page size, etc.). In the case of the first data element being '001' and identifying a 64 KB actual page size, an additional low order bit is not used to store the address in the memory address field. This additional bit is left for encoding of the second data element (e.g., the base page size). If the bit is '0', then the base page size is the same as the actual page size (64 KB). In all other cases shown, the actual page size is 1 MB or greater, so at least five additional bits of the memory address field are available for encoding. In the embodiment shown, the next three low order bits (enclosed by square brackets ("[ . . . ]") encode the second data element. In the example shown, if the encoding bits for the second data element are '000', then the base page size is the same as the actual page size. If the second data element is '001', then the base page size is 64 KB. If the second data element is '010', then the base page size is '1 MB" for those with actual page sizes greater than 1 MB, if the second data element is '011', then the base page size is 16 MB for those with actual page sizes greater than 16 MB, and if the second data element is '111' then the base page size is 4 KB for those with actual page sizes greater than 64 KB.

Processing of encoding scheme 400 commences at 450. Processing performs an algorithm that reads and decodes the encoded first and second data elements at predefined process 475 (see FIG. 5 and corresponding text for processing details). After the algorithm is completed, the process terminates at 495.

FIG. 5 is an exemplary flowchart diagram of a process that reads an encoding scheme, such as the example encoding scheme shown in FIG. 4. Processing commences at 501 whereupon processing, at step 505, receives virtual address (VA) 502 and additional data bits from Segment Lookaside Buffer (SLB) 500. Processing then checks a translation cache, at predefined process 510, in order to determine if the address is in the cache. Processing then determines whether a valid address was found in the translation cache (decision 515). If a valid address was found in the translation cache, then processing branches to the "yes" branch whereupon, at step 518, processing uses the address found in the translation cache and processing terminates.

On the other hand, if a valid address was not found in the translation cache, then processing branches to the "no" branch whereupon processing determines whether a bit in the SLB (e.g., the L-bit) is not set (e.g., equal to '0') indicating that the smallest base page size (e.g., 4 KB) is being used (decision 520). If the bit is not set indicating that the smallest base page size is being used for the entry, then decision 520 branches to the "yes" branch whereupon, at step 525, processing searches page table 350 using a hash algorithm that is used for the smallest base page size (e.g., a hash algorithm for 4 KB pages). On the other hand, if the bit is set and therefore indicates that larger base page sizes is used for the entry, then decision 520 branches to the "no" branch whereupon, at step 530, processing searches page table 350 using a hash algorithm that corresponds to encoding bits within the SLB. In the example shown, the process supports four base page sizes—the smallest base page size (e.g., 4 KB) when the L-bit is '0', and three larger base page sizes (e.g., 16 MB, 64 KB, and 16 GB, etc.) when the L-bit is '1'. In the example shown, two bits are used to encode the larger base page sizes (e.g., '00' for a 16 MB base page size, '01' for a 64 KB base page size, and '10' for a 16 GB base page size). Different hash algorithms can be used for different base page sizes. At step 530, the process hashes page table 350 using the hash algorithm established for identified base page size encoded in the SLB encoding bits.

At step 540, processing selects the first entry within the hash group of page table entries that was identified by the search performed in either step 525 or 530. Processing reads the selected entry and determines whether the L-bit is set (decision 550). If the L-bit is not set (e.g., equal to zero, indicating that the smallest actual and base page size, e.g., 4 KB, is used), then processing branches to the "yes" branch whereupon, at step 560, processing treats all of the bits in the memory address field of the selected page table entry (PTE) as address bits with no bits used to encode page size information. On the other hand, if the L-bit is set (e.g., is equal to one, indicating that page sizes larger than the smallest supported page size are used), then processing branches to the "no" branch whereupon, at predefined process 570, processing identifies the first data element (e.g., the actual page size, etc.) from low order bits of the memory address field of the selected PTE (see FIG. 6 and corresponding text for processing details). After the first data element is identified, at predefined process 575, processing identifies the second data element (e.g., the base page size, etc.) from additional low order bits of the memory address field of the selected PTE (see FIG. 7 and corresponding text for processing details).

At decision 580, processing determines whether the virtual page number (VPN), first data element (e.g., actual page size), and second data element (e.g., base page size) match corresponding expected data values (e.g., Virtual Address 502 and Base Page Size from SLB encodings, etc.). If the values match, then processing branches to the "yes" branch whereupon, at step 585, processing determines that the selected entry from the page table is valid and the address found in the selected page table entry is used. On the other hand, if one or more of the values do not match, then decision 580 branches to the "no" branch whereupon processing determines whether there are any more entries in the hash group that can be processed (decision 590). If there are additional entries, then processing branches to the "yes" branch which loops back to step 540 and selects the next entry within the hash group to process as described above. This looping continues until either a matching (valid) entry is found or there are no more entries in the hash group to process. If there are no more entries in the hash group to process, then processing branches to the "no" branch whereupon, at step 595, processing generates a page fault.

Figure 6:
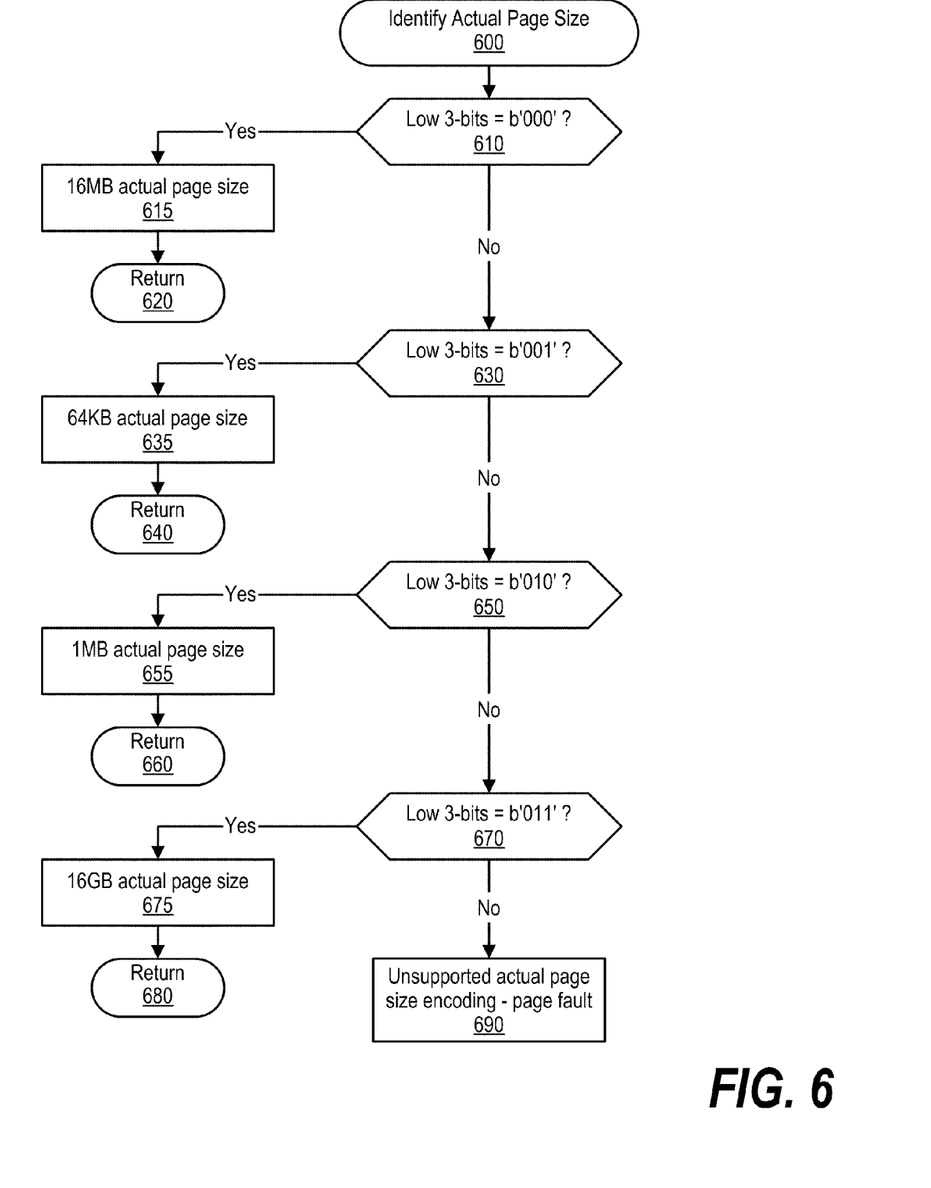
FIG. 6 is an exemplary flowchart diagram of a process that identifies an actual page size from the encoded data.

FIG. 6 is an exemplary flowchart diagram of a process that identifies a first data element (e.g., an actual page size) from the encoded data. Processing commences at 600 whereupon, at decision 610, the processing determines if the three lowest order bits are equal to '000'. If the three lowest order bits are equal to '000' then processing branches to the "yes" branch whereupon, at step 615, the first data element is decoded as being a particular value (e.g., the actual page size is decoded as being 16 MB), and processing returns to the calling routine (see FIG. 5) at 620. On the other hand, if the three lowest order bits are not equal to '000', then processing branches to the "no" branch from decision 610. At decision 630, the processing determines if the three lowest order bits are equal to '001'. If they are equal to '001', then processing branches to the "yes" branch whereupon, at step 635, the first data element is decoded as being a particular value (e.g., the actual page size is decoded as being 64 KB), and processing returns to the calling routine (see FIG. 5) at 640. On the other hand, if the three lowest order bits are not equal to '001', then processing branches to the "no" branch from decision 630. At decision 650, the processing determines if the three lowest order bits are equal to '010'. If they are equal to '010', then processing branches to the "yes" branch whereupon, at step 655, the first data element is decoded as being a particular value (e.g., the actual page size is decoded as being 1 MB), and processing returns to the calling routine (see FIG. 5) at 660. On the other hand, if the three lowest order bits are not equal to '010', then processing branches to the "no" branch from decision 650. At decision 670, the processing determines if the three lowest order bits are equal to '011'. If they are equal to '011', then processing branches to the "yes" branch whereupon, at step 675, the first data element is decoded as being a particular value (e.g., the actual page size is decoded as being 16 GB), and processing returns to the calling routine (see FIG. 5) at 680. On the other hand, if the three lowest order bits are not equal to '011', then processing branches to the "no" branch from decision 670. In the example implementation, there are no more valid encodings (e.g., no more supported actual page sizes), so if the lowest order three bits do not match any of the shown encodings then, at step 690, processing generates an error due to the unsupported encoding the lowest order three bits. As will be appreciated by those skilled in the art, fewer or more encoding bits can be used in order to provide support for fewer or more first data elements.

Figure 7:
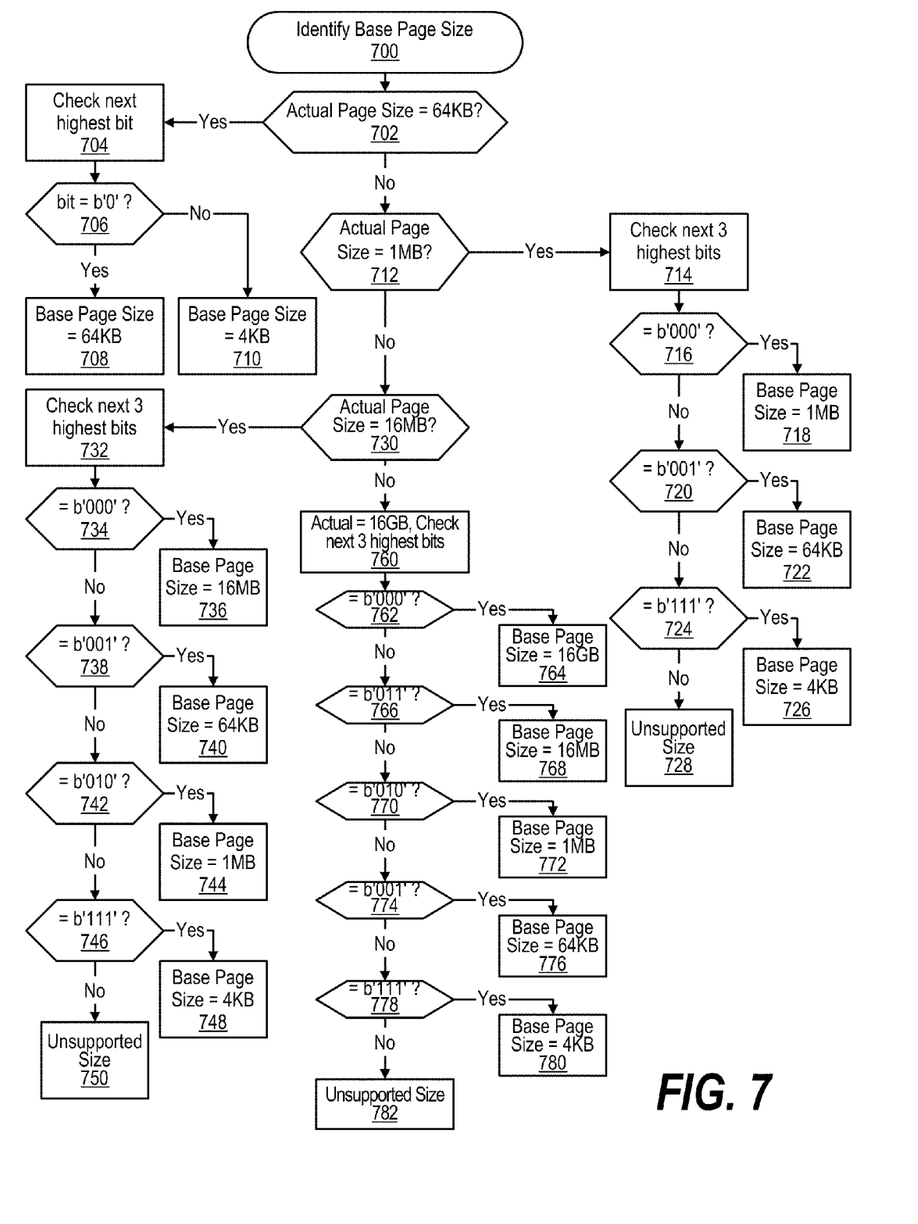
FIG. 7 is an exemplary flowchart diagram of a process that identifies a base page size from the encoded data.

FIG. 7 is an exemplary flowchart diagram of a process that identifies a base page size from the encoded data. Processing commences at 700 whereupon, at decision 702, processing checks whether the first data element was identified by the processing shown in FIG. 6 to be a particular value (e.g., whether the actual page size was identified as being 64 KB, etc.). If the first data element (e.g., the actual page size) was identified as being the particular value (e.g., 64 KB), then processing branches to the "yes" branch from decision 702. Because a 64 KB address is using all but the four lowest order bits to store the address, an additional single bit is leftover (the fourth lowest order bit) for encoding the second data element (e.g., the base page size). Processing checks this bit at step 704 and determines whether the bit is set to '0' at decision 706. If the bit is set to '0', then decision 706 branches to the "yes" branch whereupon, at step 708, processing sets the second data element (e.g., the base page size) to a first value (e.g., equal to 64 KB), and processing then returns to the calling routine (see FIG. 5). On the other hand, if the bit is not set to '0' (is equal to '1'), then processing branches to the "no" branch from decision 706 whereupon, at step 710, processing sets the second data element (e.g., the base page size) to a second value (e.g., equal to 4 KB), and processing then returns to the calling routine (see FIG. 5).

Returning to decision 702, if the first data element is not equal to the first specified value (e.g., the actual page size is not 64 KB), then processing branches to the "no" branch from decision 702. At decision 712, processing checks whether the first data element was identified by the processing shown in FIG. 6 to be another particular value (e.g., whether the actual page size was identified as being 1 MB, etc.). If the first data element (e.g., the actual page size) was identified as being the next particular value (e.g., 1 MB), then processing branches to the "yes" branch from decision 712. Because the page size is 1 MB, more additional bits are available for encoding the second data element. In the embodiment shown, the next three lowest order bits are checked (the fourth, fifth, and sixth lowest order bits). Processing checks these bits at step 714. Processing then compares these bits to a first bit pattern (e.g., '000') at decision 716. If the bits match the first bit pattern, then decision 716 branches to the "yes" branch whereupon, at step 718, the second data element is set to a first value (e.g., the base page size is set to 1 MB), and processing returns to the calling routine (see FIG. 5). On the other hand, if the bits do not match the first bit pattern, then processing branches to the "no" branch from decision 716. Next, processing compares the three checked bits to a second bit pattern (e.g., '001') at decision 720. If the bits match the second bit pattern, then decision 720 branches to the "yes" branch whereupon, at step 722, the second data element is set to a second value (e.g., the base page size is set to 64 KB), and processing returns to the calling routine (see FIG. 5). On the other hand, if the bits do not match the first bit pattern, then processing branches to the "no" branch from decision 720. Next, processing compares the three checked bits to a third bit pattern (e.g., '111') at decision 724. If the bits match the third bit pattern, then decision 720 branches to the "yes" branch whereupon, at step 726, the second data element is set to a third value (e.g., the base page size is set to 4 KB), and processing returns to the calling routine (see FIG. 5). On the other hand, if the bits do not match the first bit pattern, then processing branches to the "no" branch from decision 724. In the example shown, there are no more supported encodings when the actual page size is 1 MB, therefore, at step 728, processing generates an error (e.g., a page fault) because the bits in the checked set of three bits do not match a supported bit pattern.

Returning to decision 712, if the first data element is not equal to the second specified value (e.g., the actual page size is not 1 MB), then processing branches to the "no" branch from decision 712. At decision 730, processing checks whether the first data element was identified by the processing shown in FIG. 6 to be another particular value (e.g., whether the actual page size was identified as being 16 MB, etc.). If the first data element (e.g., the actual page size) was identified as being the next particular value (e.g., 16 MB), then processing branches to the "yes" branch from decision 730. Because the page size is 16 MB, more additional bits are available for encoding the second data element. In the embodiment shown, the next three lowest order bits are checked (the fourth, fifth, and sixth lowest order bits). Processing checks these bits at step 732. Processing then compares these bits to a first bit pattern (e.g., '000') at decision 734. If the bits match the first bit pattern, then decision 734 branches to the "yes" branch whereupon, at step 736, the second data element is set to a first value (e.g., the base page size is set to 16 MB), and processing returns to the calling routine (see FIG. 5). On the other hand, if the bits do not match the first bit pattern, then processing branches to the "no" branch from decision 734. Next, processing compares the three checked bits to a second bit pattern (e.g., '001') at decision 738. If the bits match the second bit pattern, then decision 738 branches to the "yes" branch whereupon, at step 740, the second data element is set to a second value (e.g., the base page size is set to 64 KB), and processing returns to the calling routine (see FIG. 5). On the other hand, if the bits do not match the first bit pattern, then processing branches to the "no" branch from decision 738. Next, processing compares the three checked bits to a third bit pattern (e.g., '010') at decision 742. If the bits match the third bit pattern, then decision 742 branches to the "yes" branch whereupon, at step 744, the second data element is set to a third value (e.g., the base page size is set to 1 MB), and processing returns to the calling routine (see FIG. 5). On the other hand, if the bits do not match the first bit pattern, then processing branches to the "no" branch from decision 742. Next, processing compares the three checked bits to a fourth bit pattern (e.g., '111') at decision 746. If the bits match the fourth bit pattern, then decision 746 branches to the "yes" branch whereupon, at step 748, the second data element is set to a fourth value (e.g., the base page size is set to 4 KB), and processing returns to the calling routine (see FIG. 5). On the other hand, if the bits do not match the first bit pattern, then processing branches to the "no" branch from decision 746. In the example shown, there are no more supported encodings when the actual page size is 16 MB, therefore, at step 750, processing generates an error (e.g., a page fault) because the bits in the checked set of three bits do not match a supported bit pattern.

Returning to decision 730, if the first data element is not equal to the second specified value (e.g., the actual page size is not 16 MB), then processing branches to the "no" branch from decision 730. In the example implementation, there is one other actual page size that is supported (16 GB), so at step 760, the actual page size is 16 GB. Because the actual page size is 16 GB, more additional bits are available for encoding the second data element. In the embodiment shown, the next three lowest order bits are checked (the fourth, fifth, and sixth lowest order bits). Processing checks these bits at step 760. Processing then compares these bits to a first bit pattern (e.g., '000') at decision 762. If the bits match the first bit pattern, then decision 762 branches to the "yes" branch whereupon, at step 764, the second data element is set to a first value (e.g., the base page size is set to 16 GB), and processing returns to the calling routine (see FIG. 5). On the other hand, if the bits do not match the first bit pattern, then processing branches to the "no" branch from decision 762. Next, processing compares the three checked bits to a second bit pattern (e.g., '011') at decision 766. If the bits match the second bit pattern, then decision 766 branches to the "yes" branch whereupon, at step 768, the second data element is set to a second value (e.g., the base page size is set to 16 MB), and processing returns to the calling routine (see FIG. 5). On the other hand, if the bits do not match the first bit pattern, then processing branches to the "no" branch from decision 766. Next, processing compares the three checked bits to a third bit pattern (e.g., '010') at decision 770. If the bits match the third bit pattern, then decision 770 branches to the "yes" branch whereupon, at step 772, the second data element is set to a third value (e.g., the base page size is set to 1 MB), and processing returns to the calling routine (see FIG. 5). On the other hand, if the bits do not match the first bit pattern, then processing branches to the "no" branch from decision 770. Next, processing compares the three checked bits to a fourth bit pattern (e.g., '001') at decision 774. If the bits match the fourth bit pattern, then decision 774 branches to the "yes" branch whereupon, at step 776, the second data element is set to a fourth value (e.g., the base page size is set to 64 KB), and processing returns to the calling routine (see FIG. 5). On the other hand, if the bits do not match the first bit pattern, then processing branches to the "no" branch from decision 774. Finally, processing compares the three checked bits to a fifth bit pattern (e.g., '111') at decision 778. If the bits match the fifth bit pattern, then decision 778 branches to the "yes" branch whereupon, at step 780, the second data element is set to a fifth value (e.g., the base page size is set to 4 KB), and processing returns to the calling routine (see FIG. 5). On the other hand, if the bits do not match the first bit pattern, then processing branches to the "no" branch from decision 778. In the example shown, there are no more supported encodings when the actual page size is 16 GB, therefore, at step 782, processing generates an error (e.g., a page fault) because the bits in the checked set of three bits do not match a supported bit pattern.

Figure 8:
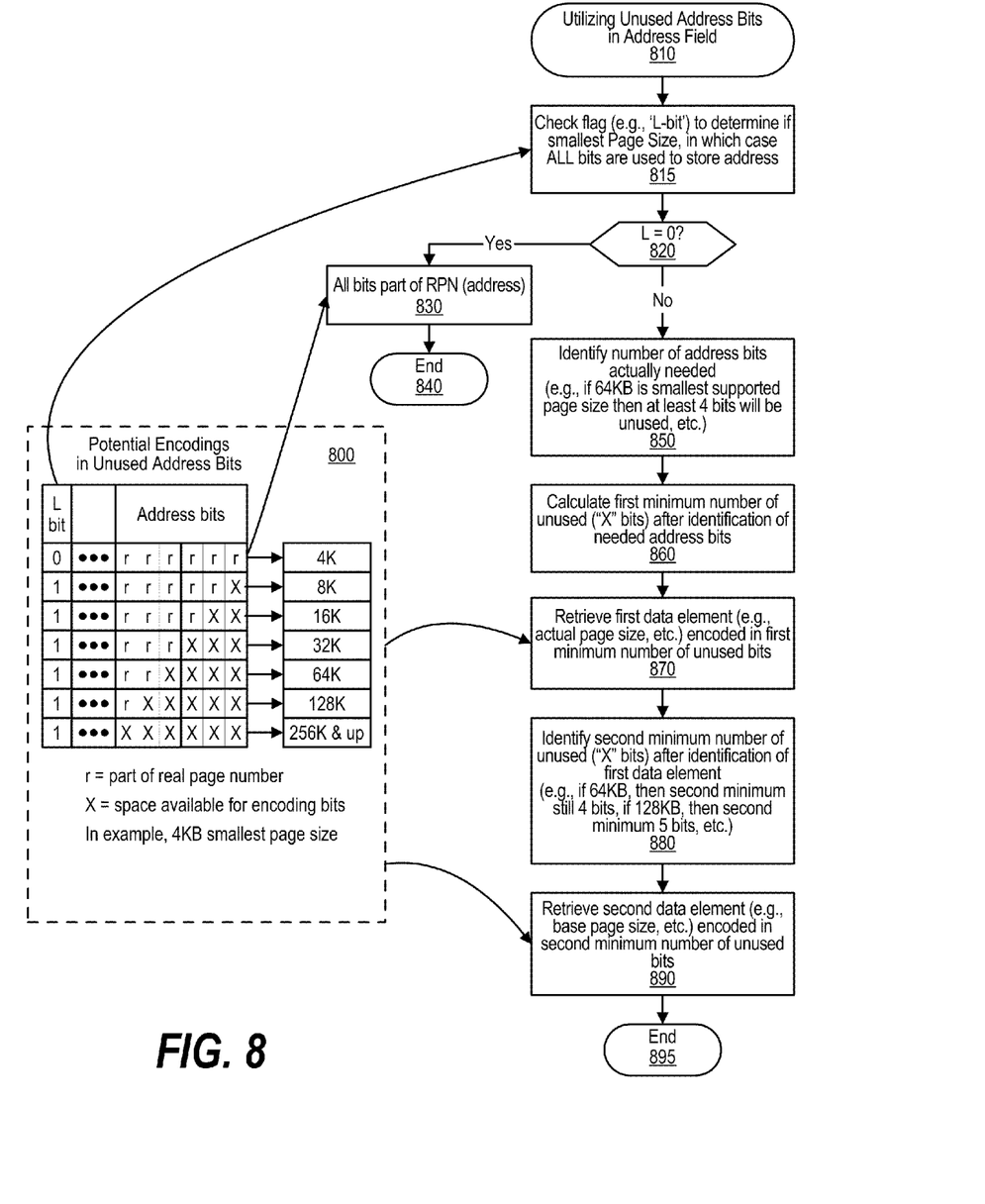
FIG. 8 is an exemplary flowchart diagram of a process that utilizes unused address bits to store/read encoded data.

FIG. 8 is an exemplary flowchart diagram of a process that utilizes unused address bits to store/read encoded data. Processing commences at 810 whereupon, at step 815, the process reads a flag from memory structure 800 (e.g., the L-bit) that indicates whether all of the bits in the address field are used to store the memory address. The process decides whether all of the bits in the address field are used to store the memory address based on this bit value (decision 820). If all of the bits in the memory address field are used to store the memory address, then processing branches to the "yes" branch from decision 820 whereupon, at step 830, processing does not decode any address bits and processing thereafter ends at 840.

On the other hand, if the bit value indicates that one or more low order memory address bits are used to store data elements in the memory address field, then processing branches to the "no" branch from decision 820. At step 850, processing identifies a number of address bits actually needed to store the memory address. For example, if the smallest supported page size is 64 KB, then there will be at least four unused bits that can be used to encode one or more data elements. At step 860, processing calculates a first minimum number of low order bits after identifying the number of address bits that are needed to store the address. At step 870, a first data element (e.g., an encoding of an actual page size, etc.) is retrieved from the first minimum number of low order bits. At step 880, processing identifies a second minimum number of low order bits after the identification of the first data element. For example, if the first data element revealed that the actual page size is 128 KB, then the second minimum number of low order bits would be five, if the first data element revealed that the actual page size is 256 KB, then the second minimum number of low order bits would be six, etc. At step 890, processing retrieves the second data element (e.g., an encoding of a base page size, etc.) from the second minimum number of low order bits. Processing thereafter ends at 895.

Figure 9:
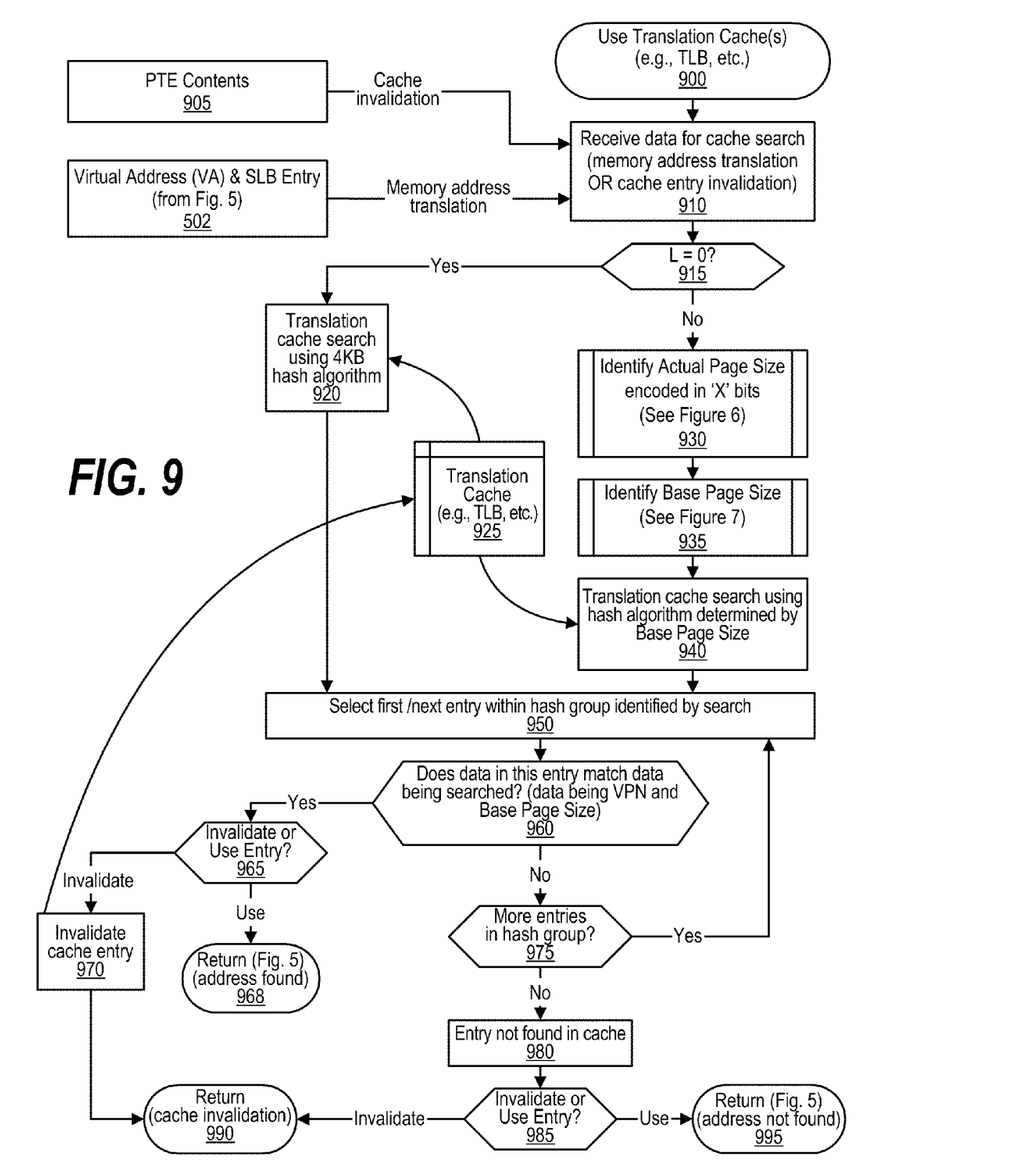
FIG. 9 is an exemplary flowchart diagram of a process that uses a translation cache.

FIG. 9 is an exemplary flowchart diagram of a process that uses a translation cache, such as a Table Lookaside Buffer (TLB). Processing commences at 900 whereupon, at step 910, the process receives data to use in searching the cache. If the process is being used to invalidate a cache entry, then step 910 receives the data from page table entry (PTE) contents corresponding to the entry that is being invalidated in the cache. If the process is being used for memory address translation, then step 910 receives the data from the virtual address (VA) and the Segment Lookaside Buffer (SLB) entries received in step 505 shown in FIG. 5.

Returning to FIG. 9, at decision 915, the process checks a flag that indicates whether the smallest supported page size (e.g., 4 KB) is being used. If the smallest supported page size is being used, then decision 915 branches to the "yes" branch whereupon, at step 920, the process uses a hash algorithm corresponding to the smallest page size (e.g., a 4 KB hash algorithm) to search translation cache 925. On the other hand, if the flag does not indicate that the smallest page size is being used, then processing branches to the "no" branch from decision 915. Following this path, processing, at predefined process 930, retrieves the first data element (e.g., the actual page size) encoded in a first of a minimum number of low order bits of the memory address field (see FIG. 6 and corresponding text for processing details). After the first data element is retrieved from the memory address field, at predefined process 935, the process retrieves the second data element (e.g., the base page size) encoded in a second minimum number of low order bits of the memory address field. In one embodiment, the second minimum number of low order bits and the second data element are based on the retrieved first data element. At step 940, processing searches translation cache 925 using a hash algorithm that is based on one of the retrieved data elements (e.g., the hash algorithm based upon the base page size, etc.).

At step 950, processing selects the first entry within the hash group returned by the search that was performed in either step 920 or 940. At decision 960, the process determines whether the data in the selected entry matches the expected values of the data being searched (e.g., the Virtual Address and the Base Page Size, etc.). If the data matches the expected values, then processing branches to the "yes" branch from decision 960 whereupon, at decision 965, the process determines whether the process is being used to invalidate the cache entry or to use the cache entry. If the process is being performed in order to use the cache entry, then processing branches to the "use" branch whereupon processing returns to the calling routine (see FIG. 5) with the sought address being found. On the other hand, if the process is being used to invalidate the cache entry, then processing branches to the "invalidate" branch from decision 965 whereupon, at step 970, the process invalidates the selected cache entry in translation cache 925 and processing returns to the routine that called this process at 990.

Returning to decision 960, if the data in the selected entry does not match the expected data, then processing branches to the "no" branch from decision 960. At decision 975, processing determines whether there are any more entries in the hash group returned by the search performed in either step 920 or 940. If there are more entries in the hash group, then processing branches to the "yes" branch which loops back to select and process the next entry. This looping continues until either a matching entry is found in the translation cache (decision 960 branching to the "yes" branch), or until there are no more entries in the hash group to process. If there are no more entries in the hash group to process then, at decision 975, processing branches to the "no" branch whereupon, at step 980, the entry was not found in the translation cache. At decision 985, the process determines whether the process is being used to invalidate the cache entry or to use the cache entry. If the process is being performed in order to use the cache entry, then processing branches to the "use" branch whereupon processing returns to the calling routine (see FIG. 5) with a return code indicating that the sought address was not found in the translation cache. On the other hand, if the process is being used to invalidate the cache entry, then processing branches to the "invalidate" branch from decision 985 whereupon processing returns to the routine that called this process at 990 without invalidating any translation cache entries since a matching entry was not found.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A processor-implemented method comprising:
    identifying an amount of high order bits used to store a memory address in a memory address field included in a memory structure accessible by one or more processors;
    calculating, using one of the processors, one or more minimum numbers of low order bits not used to store the address, wherein the calculating is based on the identified amount of high order bits;
    retrieving, using one of the processors, a first data element from a first of the minimum numbers of low order bits of the address field; and
    retrieving, using one of the processors, a second data element from a second of the minimum numbers of low order bits of the address field.

2. The method of claim 1 wherein the first data element is a first page size encoding, the method further comprising:
    translating the first page size encoding to a first page size.

3. The method of claim 1 further comprising:
    identifying, based on the first data element, the second minimum number of low order bits not used to store the address, wherein the second minimum number of low order bits is not smaller than the first minimum number of low order bits.

4. The method of claim 3 wherein the second data element is a second page size encoding, the method further comprising:
    translating the second page size encoding to a second page size.

5. The method of claim 4 wherein the first page size is an actual page size and wherein the second page size is a base page size, wherein the method further comprises:
    selecting a hash algorithm based on the base page size;
    hashing a translation cache using the base page size, wherein the hashing results in a group of one or more entries of the translation cache;
    identifying one of the entries in the group of entries as corresponding to the memory structure that includes the memory address; and
    invalidating the identified entry in the translation cache.

6. The method of claim 4 wherein the first page size is an actual page size and wherein the second page size is a base page size, wherein the method further comprises:
    selecting a hash algorithm based on the base page size;
    hashing a translation cache using the base page size, wherein the hashing results in a group of one or more entries of the translation cache;
    identifying one of the entries in the group of entries as corresponding to the memory structure that includes the memory address; and
    using the identified entry from the group of entries as a valid address translation.

7. The method of claim 1 wherein the memory structure is a hashable memory table, the method further comprising:
    prior to the identifying:
        identifying a first base page size encoding in a buffer entry that corresponds to a selected entry in the hashable memory table where the memory address is stored;
        selecting a hash algorithm based on the first base page size;
        hashing the hashable memory table using the selected hash algorithm, wherein the hashing results in a group of one or more entries stored in the hashable memory table; and
        identifying one of the group of entries as the selected entry.

8. The method of claim 7 wherein the first data element is an actual page size encoded in the selected entry, the method further comprising:
    identifying, based on the actual page size, a second minimum number of low order bits not used to store the address in the selected entry, wherein the second minimum number of low order bits is not smaller than the first minimum number of low order bits;
    retrieving a second base page size from the second minimum number of low order bits of the address field within the selected entry.

9. The method of claim 1 further comprising:
    prior to the identifying:
        checking an encoding flag within the memory structure, wherein the identifying, calculating, and retrieving steps are performed in response to the encoding flag indicating that the memory address field is being used to store the first data element.

10. An information handling system comprising:
    one or more processors;
    a memory coupled to at least one of the processors;
    a set of instructions stored in the memory and executed by at least one of the processors in order to perform actions of:
        identifying an amount of high order bits used to store a memory address in a memory address field included in a memory structure accessible by at least one of the processors;
        calculating one or more minimum numbers of low order bits not used to store the address, wherein the calculating is based on the identified amount of high order bits;
        retrieving a first data element from a first of the minimum numbers of low order bits of the address field; and
        retrieving a second data element from a second of the minimum numbers of low order bits of the address field.

11. The information handling system of claim 10 wherein the first data element is a first page size encoding, and wherein the set of instructions performs additional actions comprising:
translating the first page size encoding to a first page size.

12. The information handling system of claim 10 wherein the set of instructions performs additional actions comprising:
identifying, based on the first data element, the second minimum number of low order bits not used to store the address, wherein the second minimum number of low order bits is not smaller than the first minimum number of low order bits.

13. The information handling system of claim 12 wherein the second data element is a second page size encoding, and wherein the set of instructions performs additional actions comprising:
translating the second page size encoding to a second page size.

14. The information handling system of claim 13 wherein the first page size is an actual page size, wherein the second page size is a base page size, and wherein the set of instructions performs additional actions comprising:
selecting a hash algorithm based on the base page size;
hashing a translation cache using the base page size, wherein the hashing results in a group of one or more entries of the translation cache;
identifying one of the entries in the group of entries as corresponding to the memory structure that includes the memory address; and
invalidating the identified entry in the translation cache.

15. The information handling system of claim 13 wherein the first page size is an actual page size, wherein the second page size is a base page size, and wherein the set of instructions performs additional actions comprising:
selecting a hash algorithm based on the base page size;
hashing a translation cache using the base page size, wherein the hashing results in a group of one or more entries of the translation cache;
identifying one of the entries in the group of entries as corresponding to the memory structure that includes the memory address; and
using the identified entry from the group of entries as a valid address translation.

16. The information handling system of claim 15 wherein the first data element is an actual page size encoded in the selected entry, and wherein the set of instructions performs additional actions comprising:
identifying, based on the actual page size, a second minimum number of low order bits not used to store the address in the selected entry, wherein the second minimum number of low order bits is not smaller than the first minimum number of low order bits;
retrieving a second base page size from the second minimum number of low order bits of the address field within the selected entry.

17. The information handling system of claim 10 wherein the memory structure is a hashable memory table, and wherein the set of instructions performs additional actions comprising:
prior to the identifying:
identifying a first base page size encoding in a buffer entry that corresponds to a selected entry in the hashable memory table where the memory address is stored;
selecting a hash algorithm based on the first base page size;
hashing the hashable memory table using the selected hash algorithm, wherein the hashing results in a group of one or more entries stored in the hashable memory table; and
identifying one of the group of entries as the selected entry.

18. A computer program product stored in a computer readable storage medium, comprising instructions that, when executed by an information handling system, causes the information handling system to perform actions that include:
identifying an amount of high order bits used to store a memory address in a memory address field included in a memory structure accessible by one or more processors;
calculating one or more minimum numbers of low order bits not used to store the address, wherein the calculating is based on the identified amount of high order bits;
retrieving a first data element from a first of the minimum numbers of low order bits of the address field; and
retrieving a second data element from a second of the minimum numbers of low order bits of the address field.

19. The computer program product of claim 18 wherein the first data element is a first page size encoding, and wherein the actions further comprise:
translating the first page size encoding to a first page size.

20. The computer program product of claim 18 wherein the actions further comprise:
identifying, based on the first data element, the second minimum number of low order bits not used to store the address, wherein the second minimum number of low order bits is not smaller than the first minimum number of low order bits.

21. The computer program product of claim 20 wherein the second data element is a second page size encoding, and wherein the actions further comprise:
translating the second page size encoding to a second page size.

22. The computer program product of claim 21 wherein the first page size is an actual page size, wherein the second page size is a base page size, and wherein the actions further comprise:
selecting a hash algorithm based on the base page size;
hashing a translation cache using the base page size, wherein the hashing results in a group of one or more entries of the translation cache;
identifying one of the entries in the group of entries as corresponding to the memory structure that includes the memory address; and
invalidating the identified entry in the translation cache.

23. The computer program product of claim 21 wherein the first page size is an actual page size, wherein the second page size is a base page size, and wherein the actions further comprise:
selecting a hash algorithm based on the base page size;
hashing a translation cache using the base page size, wherein the hashing results in a group of one or more entries of the translation cache;
identifying one of the entries in the group of entries as corresponding to the memory structure that includes the memory address; and
using the identified entry from the group of entries as a valid address translation.

24. The computer program product of claim 23 wherein the first data element is an actual page size encoded in the selected entry, and wherein the actions further comprise:
identifying, based on the actual page size, a second minimum number of low order bits not used to store the address in the selected entry, wherein the second minimum number of low order bits is not smaller than the first minimum number of low order bits;

retrieving a second base page size from the second minimum number of low order bits of the address field within the selected entry.

25. The computer program product of claim 18 wherein the memory structure is a hashable memory table, and wherein the actions further comprise:

prior to the identifying:
- identifying a first base page size encoding in a buffer entry that corresponds to a selected entry in the hashable memory table where the memory address is stored;
- selecting a hash algorithm based on the first base page size;
- hashing the hashable memory table using the selected hash algorithm, wherein the hashing results in a group of one or more entries stored in the hashable memory table; and
- identifying one of the group of entries as the selected entry.

\* \* \* \* \*